United States Patent
Machida

(10) Patent No.: US 7,386,390 B2
(45) Date of Patent: Jun. 10, 2008

(54) VARIABLE VALVE CONTROL APPARATUS FOR INTERNAL COMBUSTION ENGINE AND METHOD THEREOF

(75) Inventor: Kenichi Machida, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/655,133

(22) Filed: Jan. 19, 2007

(65) Prior Publication Data

US 2007/0131199 A1 Jun. 14, 2007

Related U.S. Application Data

(62) Division of application No. 11/318,603, filed on Dec. 28, 2005, now Pat. No. 7,191,050, which is a division of application No. 10/716,532, filed on Nov. 20, 2003, now Pat. No. 7,013,211.

(30) Foreign Application Priority Data

| Dec. 2, 2002 | (JP) | ............................ 2002-350276 |
| Dec. 2, 2002 | (JP) | ............................ 2002-350277 |

(51) Int. Cl.
*G06F 19/00* (2006.01)
*F01L 1/34* (2006.01)

(52) U.S. Cl. ..................... 701/110; 123/90.15; 123/347

(58) Field of Classification Search ........ 701/101–105, 701/115; 123/90.15–90.18, 347, 348, 321, 123/322, 672, 673, 674; 60/285
See application file for complete search history.

(56) References Cited

U.S. PATENT DOCUMENTS

| 4,691,670 | A | 9/1987 | Bonisch et al. |
| 5,377,654 | A | 1/1995 | LoRusso et al. |
| 6,260,524 | B1 | 7/2001 | Wachi |
| 6,321,715 | B1 | 11/2001 | Dong |
| 6,325,047 | B2 * | 12/2001 | Kawakami ............. 123/406.64 |
| 6,439,175 | B2 * | 8/2002 | Arai et al. ................ 123/90.11 |
| 6,457,353 | B1 | 10/2002 | Kanke et al. |
| 6,519,933 | B2 | 2/2003 | Ogiso et al. |
| 6,612,274 | B2 * | 9/2003 | Iizuka et al. ............. 123/90.16 |
| 6,626,144 | B1 * | 9/2003 | Kanamaru ................... 123/399 |
| 6,636,797 | B2 | 10/2003 | Yoshizawa et al. |
| 6,729,126 | B2 | 5/2004 | Ogiso et al. |
| 6,742,498 | B2 | 6/2004 | Mabuchi et al. |
| 6,851,409 | B2 * | 2/2005 | Machida et al. ............ 123/399 |
| 6,959,254 | B2 * | 10/2005 | Reuschenbach et al. .... 702/100 |
| 6,999,864 | B2 | 2/2006 | Lizuka et al. |

(Continued)

FOREIGN PATENT DOCUMENTS

DE 100 26 990 A1 6/2001

(Continued)

*Primary Examiner*—John T. Kwon
(74) *Attorney, Agent, or Firm*—Foley & Lardner LLP

(57) ABSTRACT

A requested volume flow ratio calculated based on a requested torque, an amount of two times a spit-back gas amount at the valve overlap time calculated based on a requested residual gas rate, and a spit-back gas amount of the time when an intake valve is closed are added together, to set a requested valve passing gas amount of the intake valve, thereby determining a target operating characteristic of the intake valve based on the requested valve passing gas amount.

2 Claims, 16 Drawing Sheets

U.S. PATENT DOCUMENTS

| | | |
|---|---|---|
| 7,013,211 B2 | 3/2006 | Machida |
| 7,191,050 B2 * | 3/2007 | Machida .................... 701/103 |
| 2002/0011233 A1 | 1/2002 | Shiraishi et al. |
| 2002/0100440 A1 | 8/2002 | Takahashi et al. |
| 2002/0108593 A1 * | 8/2002 | Hoshino et al. ......... 123/90.17 |
| 2002/0121266 A1 * | 9/2002 | Nogi et al. ................. 123/361 |
| 2003/0079703 A1 | 5/2003 | Iizuka et al. |
| 2004/0060540 A1 | 4/2004 | Fuwa |
| 2004/0107929 A1 | 6/2004 | Machida |
| 2004/0173170 A1 | 9/2004 | Gaessler et al. |

FOREIGN PATENT DOCUMENTS

| | | |
|---|---|---|
| JP | 6-272580 A | 9/1994 |
| JP | 9-195840 A | 7/1997 |
| JP | 2001-12262 A | 1/2001 |
| JP | 2001-41013 A | 2/2001 |
| JP | 2001-164951 A | 6/2001 |
| JP | 2002-047951 | 2/2002 |

* cited by examiner

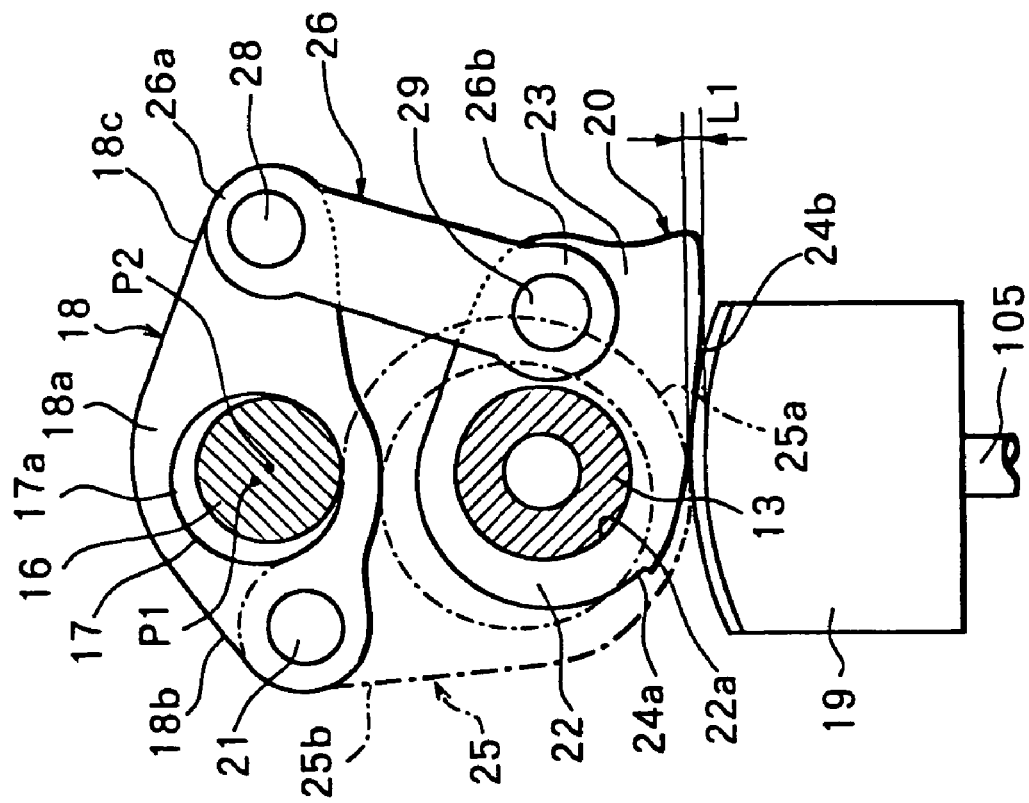
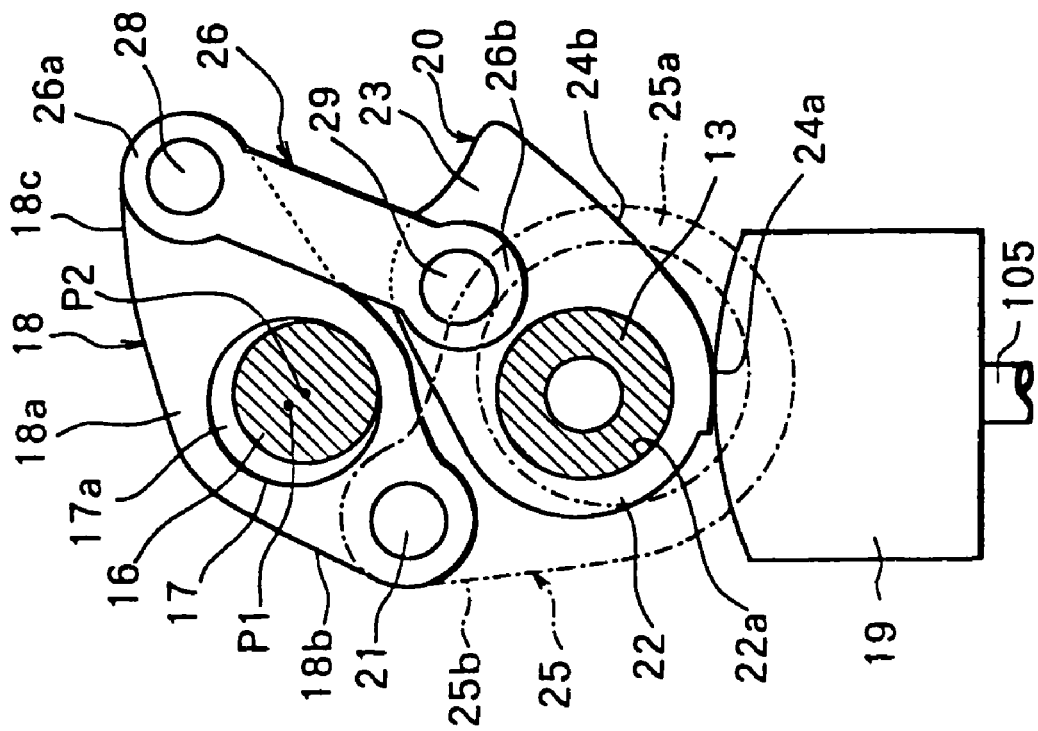

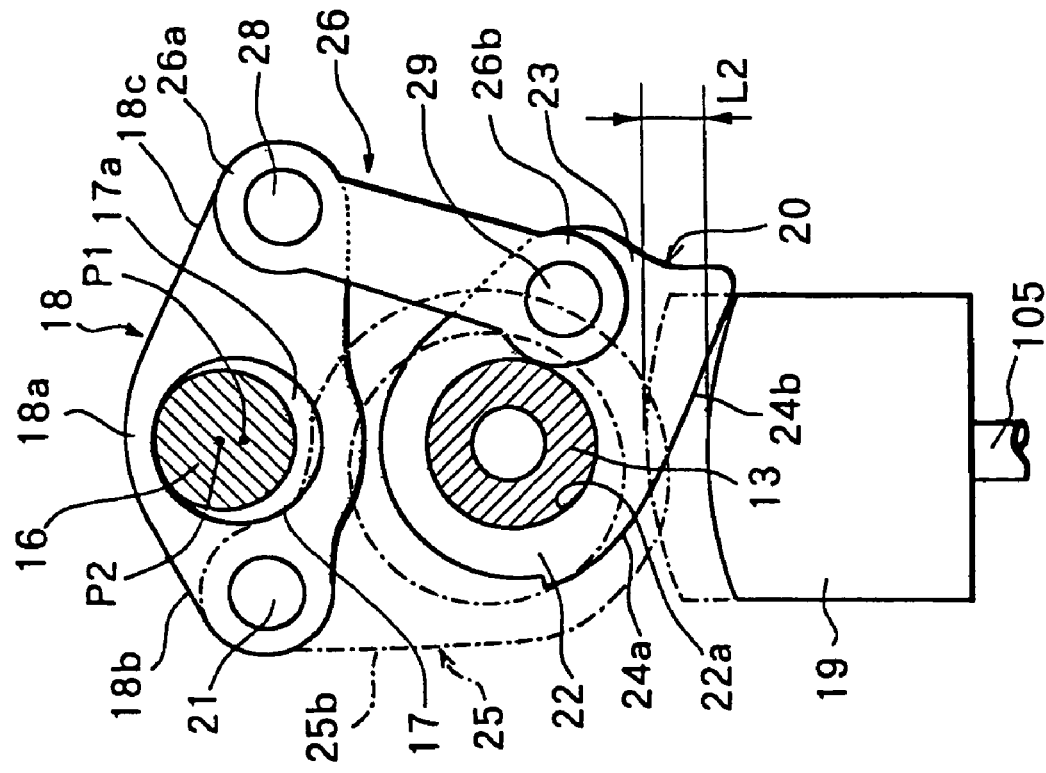
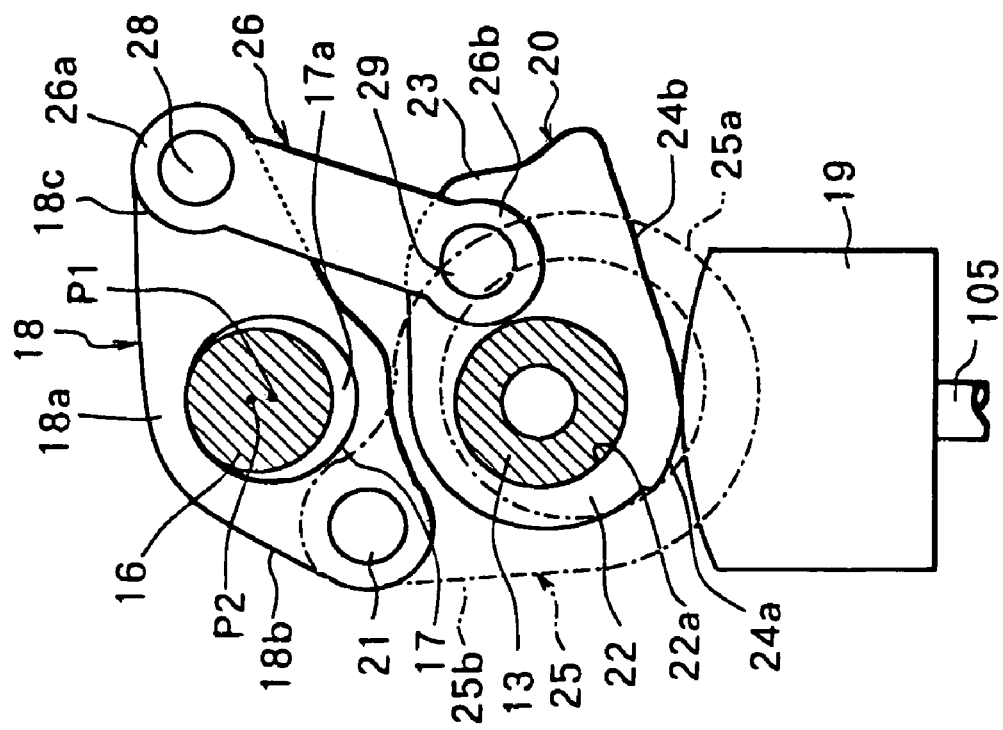

VARIABLE VALVE CONTROL APPARATUS FOR INTERNAL COMBUSTION ENGINE AND METHOD THEREOF

CROSS-REFERENCE TO RELATED APPLICATIONS

This application is a divisional of U.S. Ser. No. 11/318,603, filed Dec. 28, 2005, which is a divisional of U.S. Ser. No. 10/716,532, filed Nov. 20, 2003, both of which are incorporated herein by reference.

BACKGROUND

The present invention relates to a variable valve control apparatus and a variable valve control method for an internal combustion engine, and in particular to a technology for controlling an amount of working medium by variably controlling an operating characteristic of an intake valve.

Heretofore, there has been known an apparatus in which a target torque is set based on an accelerator opening and an engine rotation speed, and an operating characteristic of an intake valve is varied so that a target intake air amount equivalent to the target torque can be obtained (refer to Japanese Unexamined Patent Publication No. 6-272580).

Further, there has also been known a variable valve event and lift mechanism that successively varies valve lifts of engine valves together with operating angles of the engine valves (refer to Japanese Unexamined Patent Publication No. 2001-012262).

Here, since there is a constant correlation between an opening area of the intake valve and a total amount of working medium in a cylinder, it is possible to estimate the total amount of working medium in the cylinder based on the opening area of the intake valve.

Note, the total amount of working medium in the cylinder is the sum of a fresh air amount and a residual gas amount in the cylinder.

Further, the residual gas amount in the cylinder includes a spit-back gas amount to an intake side at the valve overlap time, a spit-back gas amount to the intake side at the intake valve closing time, and further a residual gas amount which has not been discharged via an exhaust valve to remain in the cylinder.

In a region where the opening area of the intake valve is large, a gas temperature in the cylinder rises with an increase of residual gas, and volume efficiency is lowered with the rise of gas temperature.

Accordingly, in the region where the opening area of the intake valve is large, the total amount of working medium in the cylinder is changed to decrease relative to an increase of opening area.

Therefore, in the region where the opening area of the intake valve is large, two opening areas exist corresponding to the total amount of inner-cylinder working medium.

Here, if it is regarded that the total amount of inner-cylinder working medium is not changed relative to the increase of opening area, it is possible to determine the number of opening areas corresponding to the total amount of inner-cylinder working medium to 1.

However, there is caused a problem of the occurrence of control error, if it is regarded that the total amount of inner-cylinder working medium is not changed relative to the increase of opening area.

Further, a correlation between the opening area of the intake valve and an intake valve passing gas amount exists for each effective cylinder capacity that is changed depending on closing timing of the intake valve.

Accordingly, in a system which controls an intake air amount using a variable valve mechanism that successively varies a valve lift and a valve operating angle, it is required to prepare a table indicating the correlation between the opening area ad the valve passing gas amount for each effective cylinder capacity (closing timing of the intake valve).

However, if the table indicating the opening area and the valve passing gas amount is prepared for each effective cylinder capacity, large storage capacity is required and also a large number of processes is required for matching each table.

SUMMARY

It is therefore an object of the present invention to enable a high accurate control of a gas amount passing through an intake valve, based on a correlation between an opening area of the intake valve and the valve passing gas amount.

A further object of the present invention is to enable the control of the valve passing gas amount without the necessity of a large storage capacity and also with a small number of matching processes.

In order to accomplish the above-mentioned objects, the present invention is constituted so that a fresh air amount flown into a cylinder of an engine and a gas amount spit back to an intake side from the inside of the cylinder when the intake valve is opened are calculated, and a gas amount passing through the intake valve is calculated based on the fresh air amount and an amount of predetermined times the spit-back gas amount of the time when the intake valve is opened, to control a variable valve mechanism based on the intake valve passing gas amount.

Moreover, according to the present invention, a correlation between a value equivalent to an opening area of the intake valve and the valve passing gas amount is stored previously, the value equivalent to the opening area of the intake valve is converted into the valve passing gas amount by referring to the correlation, the value equivalent to the opening area is corrected based on a ratio between the valve passing gas amount obtained by the conversion and a requested valve passing gas amount, and requested effective cylinder capacity by which the requested valve passing gas amount can be obtained at the value equivalent to the opening area, is calculated based on the valve passing gas amount obtained by referring to the correlation based on the corrected value equivalent to the opening area and the requested valve passing gas amount, to control the variable valve mechanism according to the requested effective cylinder capacity.

The other objects and features of the invention will become understood from the following description with reference to the accompanying drawings.

BRIEF DESCRIPTION OF THE DRAWINGS

FIGS. 6(A) and 6(B) are cross sectional views showing an operation of the variable valve event and lift mechanism at a low lift condition (B-B cross section view of FIG. 3).

FIGS. 7(A) and 7(B) are cross sectional views showing an operation of the variable valve event and lift mechanism at a high lift condition (B-B cross section view of FIG. 3).

DETAILED DESCRIPTION

Figure 1:
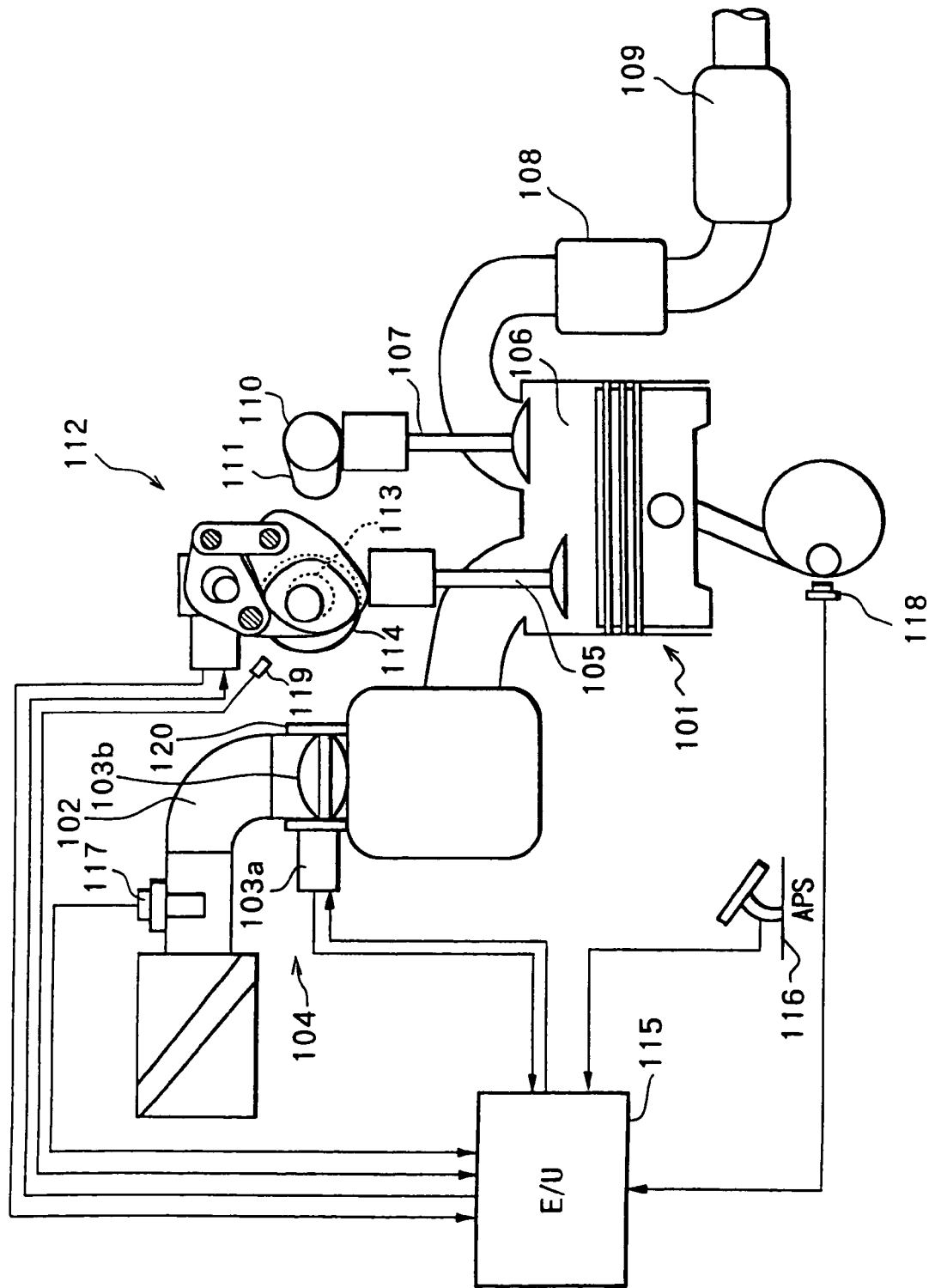
FIG. 1 is a diagram of a system structure of an internal combustion engine in an embodiment.

FIG. 1 is a diagram of a system structure of an internal combustion engine for vehicle comprising a variable valve mechanism according to the present invention.

In FIG. 1, in an intake passage 102 of an internal combustion engine 101, an electronically controlled throttle 104 is disposed for driving a throttle valve 103b to open and close by a throttle motor 103a.

Air is sucked into a combustion chamber 106 via electronically controlled throttle 104 and an intake valve 105.

A combusted exhaust gas is discharged from combustion chamber 106 via an exhaust valve 107.

Then, the combusted exhaust gas is purified by an exhaust purification catalyst 108 and thereafter, emitted into the atmosphere via a muffler 109.

Exhaust valve 107 is driven by a cam 111 axially supported by an exhaust side camshaft 110, to open and close at fixed valve lift amount, valve operating angle and valve opening/closing timing.

A valve lift and a valve operating angle of intake valve 105 are varied successively by a variable valve event and lift mechanism (to be referred to as VEL hereunder) 112.

On an end portion of an intake side camshaft 113, there is disposed a variable valve timing mechanism (to be referred to as VTC hereunder) 114 that varies successively a center phase of the operating angle of intake valve 105 by changing a rotation phase of intake side camshaft 113 relative to a crankshaft.

A control unit 115 incorporating therein a microcomputer, receives various detection signals from an accelerator opening sensor APS 116, an air flow meter 117 detecting an intake air amount (mass flow amount) Qa, a crank angle sensor 118 taking out a rotation signal Ne from the crankshaft, a cam sensor 119 detecting a rotation position of intake side camshaft 113, a throttle sensor 120 detecting an opening TVO of throttle valve 103b, and the like.

Then, control unit 115 adjusts an amount of working medium of engine 101 by the control of an operating characteristic of intake valve 105 by VEL 112 and VTC 114.

Further, control unit 115 controls an opening of throttle valve 103b so that a fixed negative pressure (for example, −50 mmHg) is generated for canister purging and blow-by gas processing.

Here, the structure of VEL 112 will be described.

Figure 2:
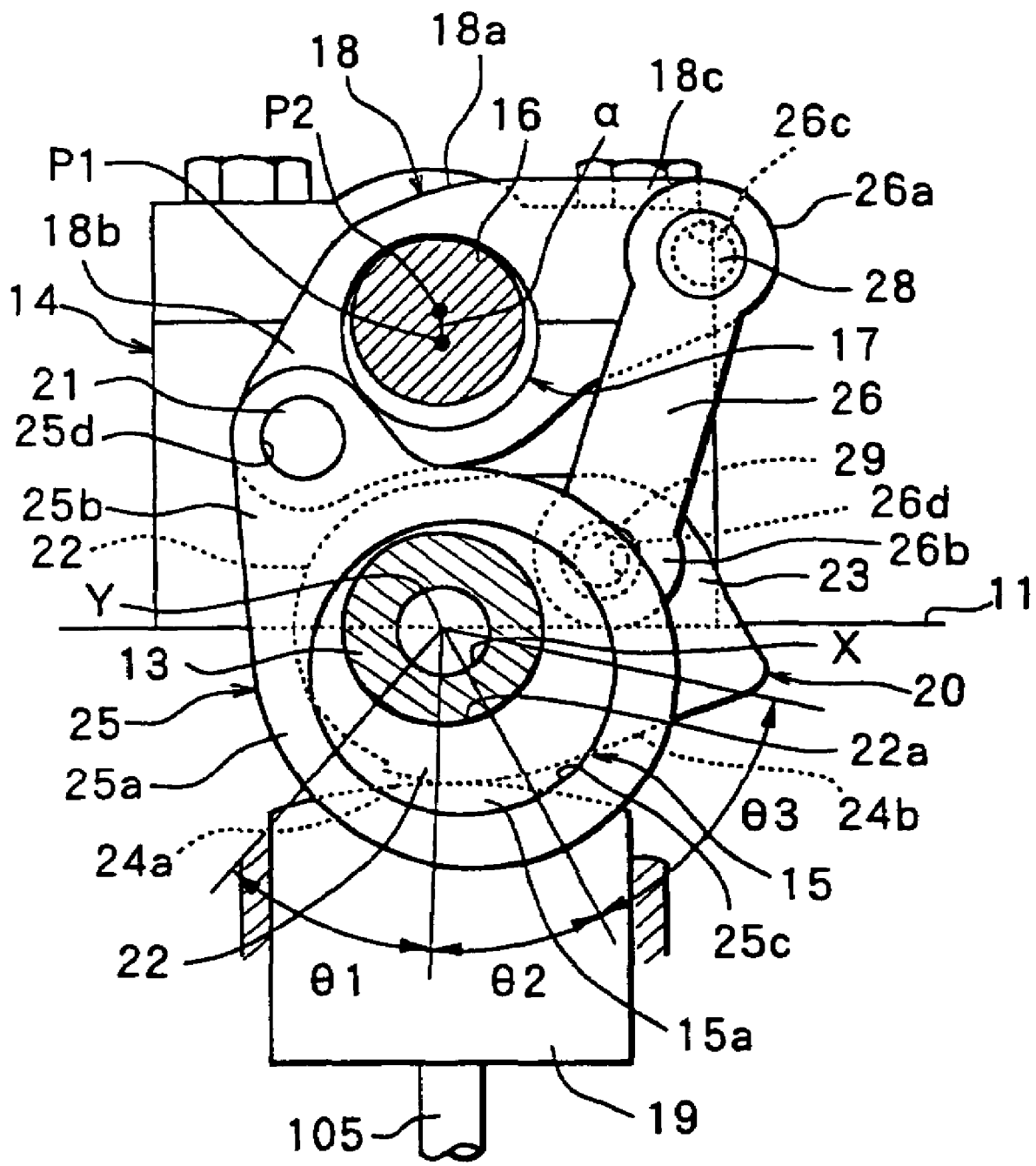
FIG. 2 is a cross section view showing a variable valve event and lift mechanism (A-A cross section of FIG. 3).
Figure 3:
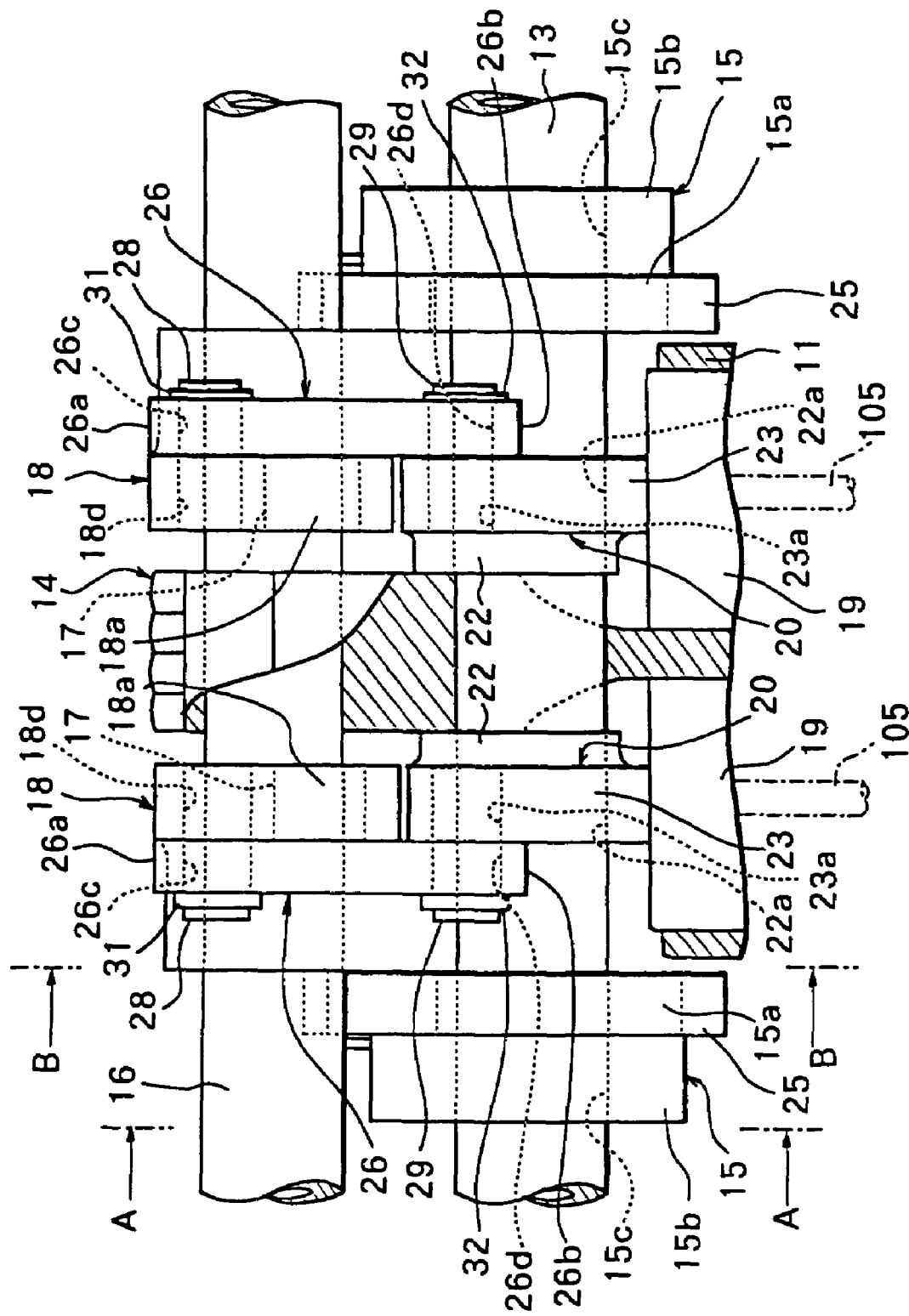
FIG. 3 is a side elevation view of the variable valve event and lift mechanism.
Figure 4:
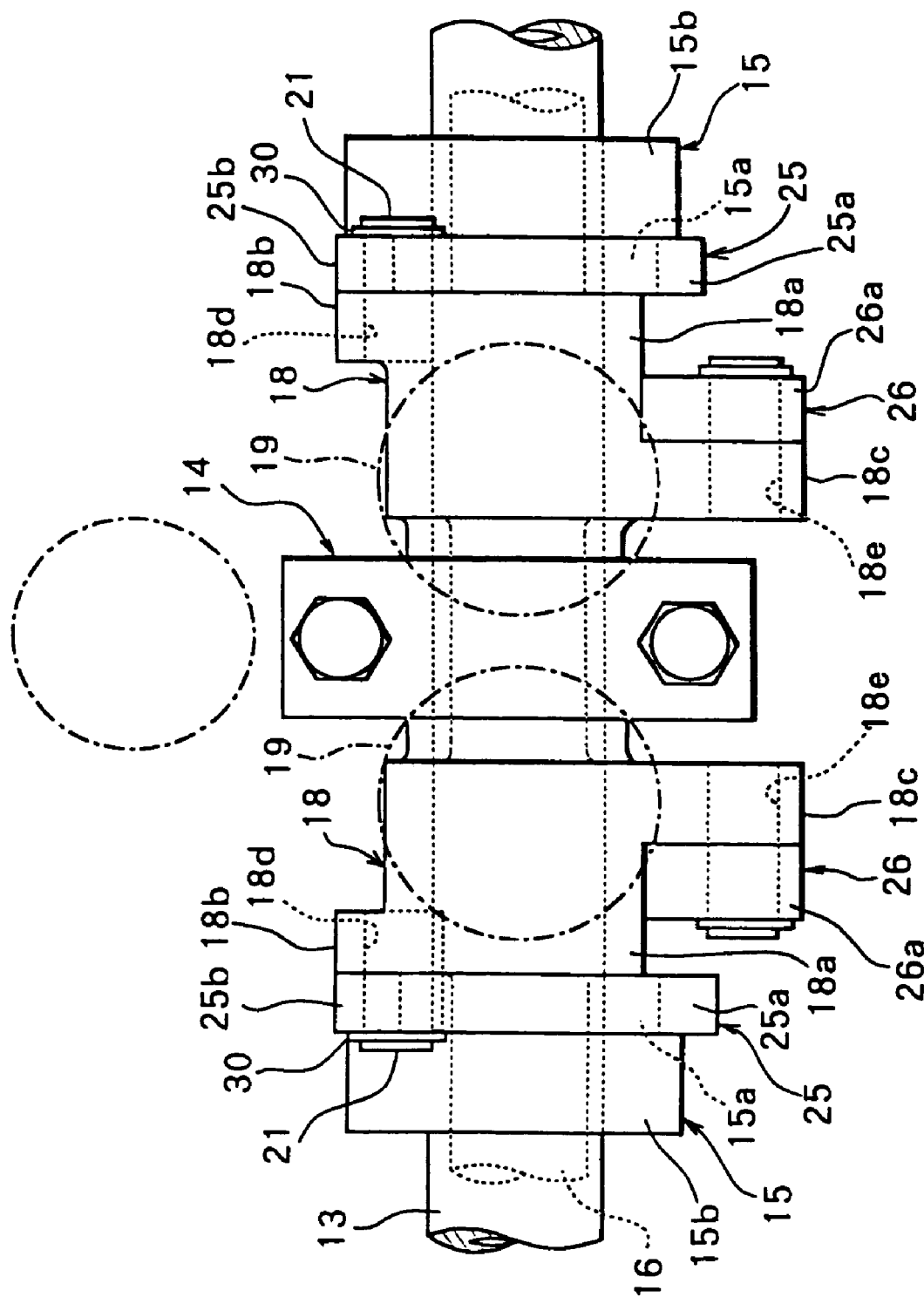
FIG. 4 is a top plan view of the variable valve event and lift mechanism.

VEL 112, as shown in FIG. 2 to FIG. 4, includes a pair of intake valves 105, 105, a hollow camshaft 13 rotatably supported by a cam bearing 14 of a cylinder head 11, two eccentric cams 15, 15 being rotation cams, axially supported by camshaft 13, a control shaft 16 rotatably supported by cam bearing 14 and arranged at an upper position of camshaft 13, a pair of rocker arms 18,18 swingingly supported by control shaft 16 through a control cam 17, and a pair of swing cams 20, 20 disposed independently from each other to upper end portions of intake valves 105, 105 through valve lifters 19, 19, respectively.

Eccentric cams 15, 15 are connected with rocker arms 18, 18 by link arms 25, 25, respectively, and rocker arms 18,18 are connected with swing cams 20, 20 by link members 26, 26.

Figure 5:
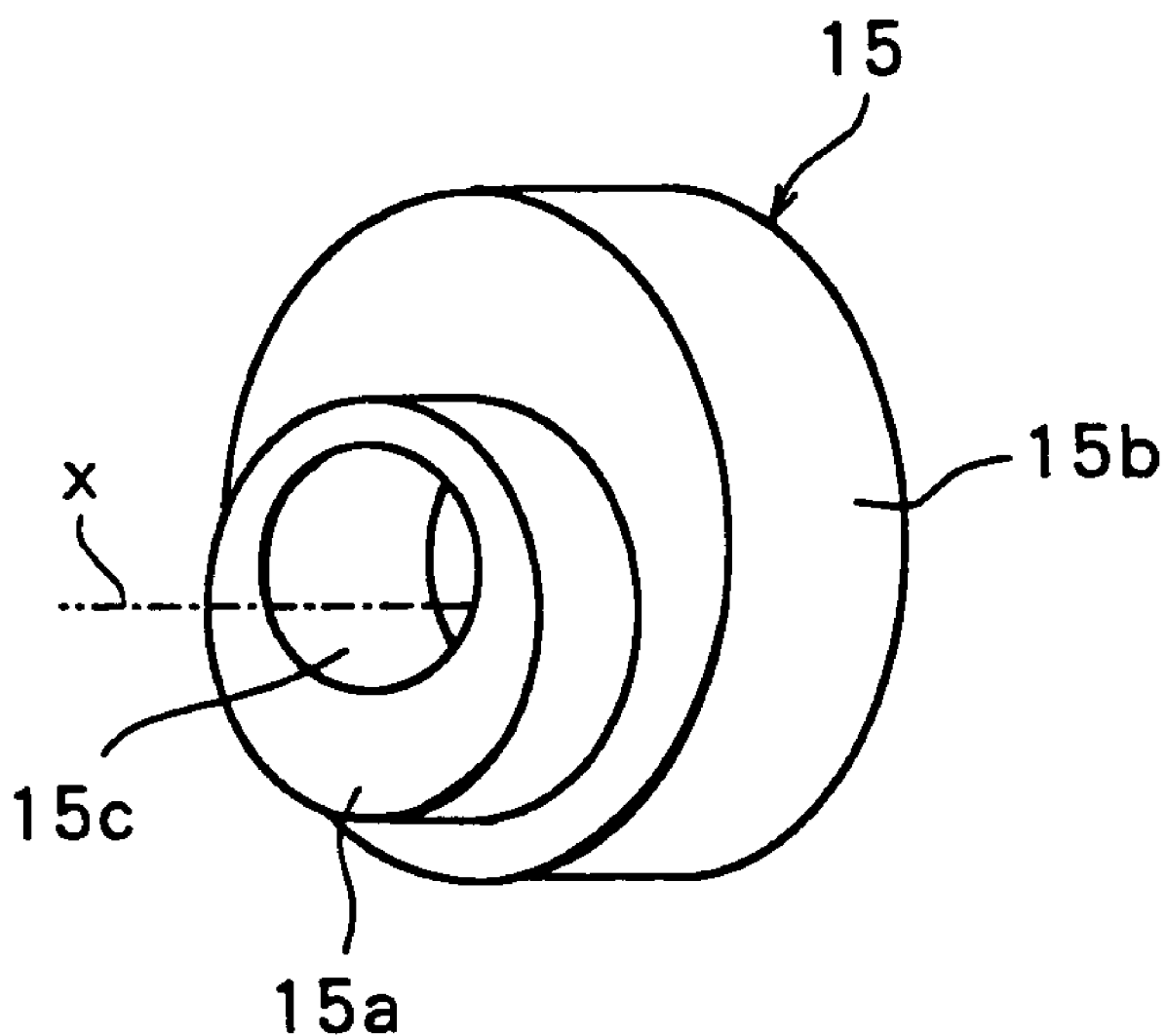
FIG. 5 is a perspective view showing an eccentric cam for use in the variable valve event and lift mechanism.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c at outsides of valve lifters 19, 19, respectively, so as not to interfere with valve lifters 19, 19. Also, outer peripheral surfaces of cam body 15a are formed in the same cam profile.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α, thereby creating spacing 17a.

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
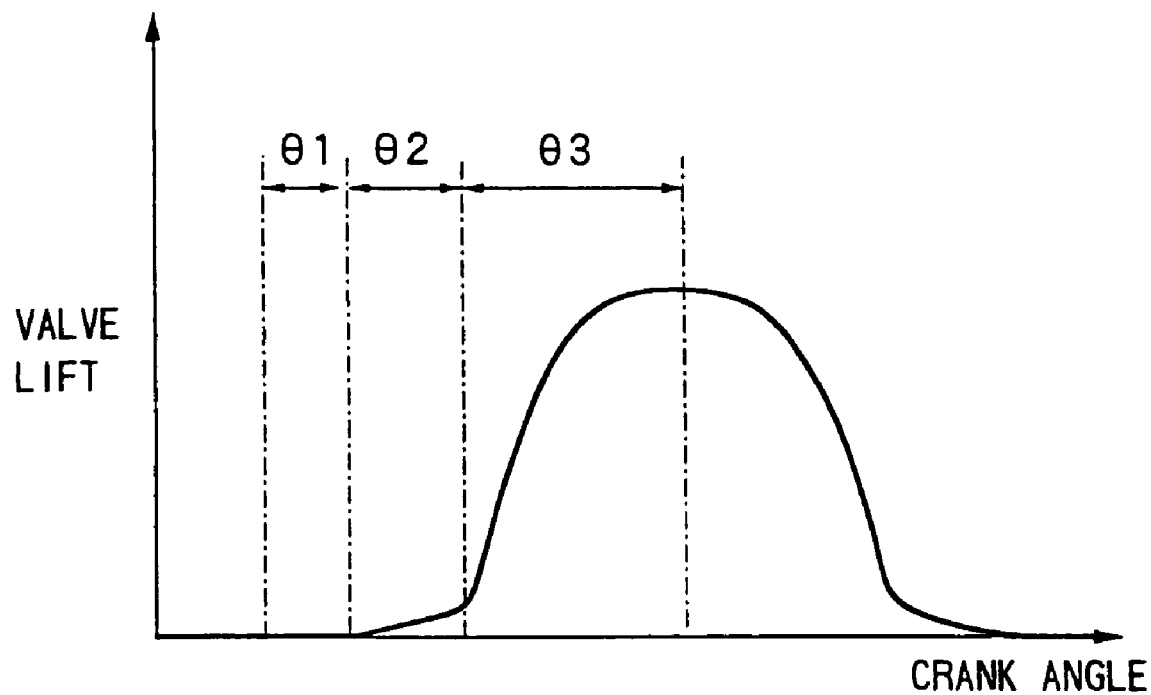
FIG. 8 is a valve lift characteristic diagram corresponding to a base end face and a cam surface of a swing cam in the variable valve event and lift mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link arm 25 and eccentric cam 15 consist a swing-drive member.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

Figure 9:
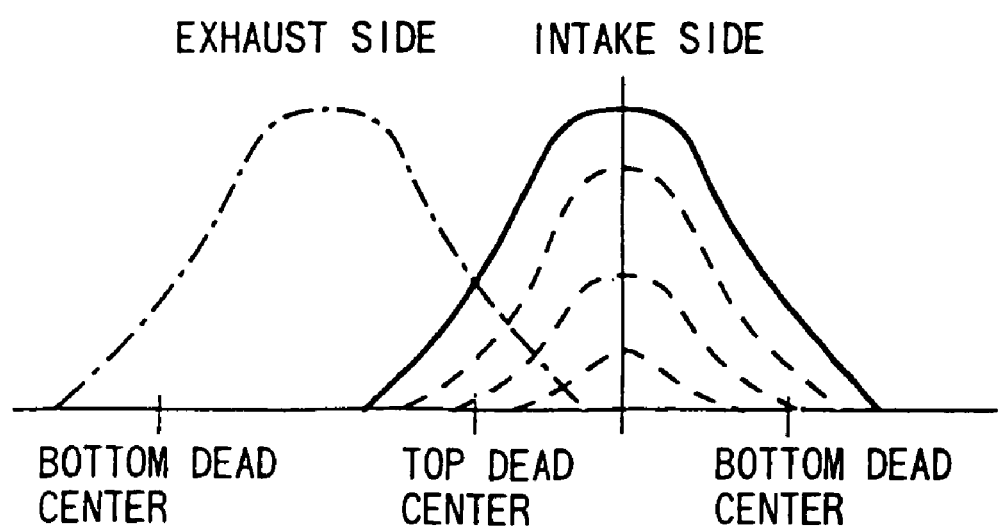
FIG. 9 is a characteristic diagram showing valve timing and a valve lift of the variable valve event and lift mechanism.
Figure 10:
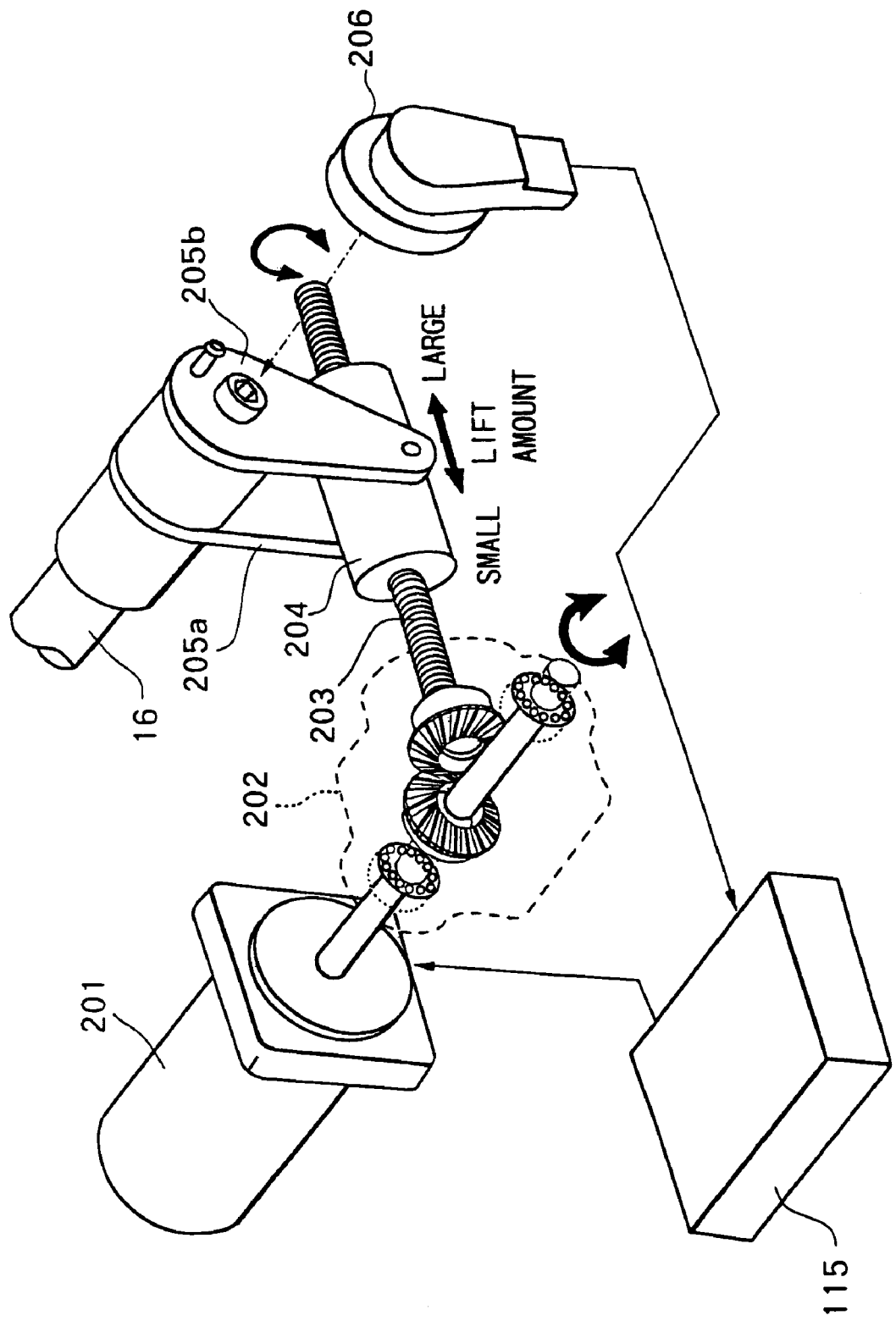
FIG. 10 is a perspective view showing a rotational driving mechanism of a control shaft in the variable valve event and lift mechanism.

Control shaft 16 is driven to rotate within a predetermined angle range by an actuator 201, such as a DC servo motor, disposed on one end portion thereof, as shown in FIG. 10. By varying an angle of control shaft 16 by actuator 201, the valve lift amount and valve operating angle of each of intake valves 105, 105 are successively varied (refer to FIG. 9).

Namely, in FIG. 10, the rotation of actuator (for example, DC servo motor) 201 is transmitted to a threaded shaft 203 via a transmission member 202, to change the axial position of a nut 204 through which shaft 203 is inserted.

Control shaft 16 is rotated by a pair of stays 205a, 205b, each mounted on the tip end of control shaft 16 and one end thereof fixed to nut 204.

In this embodiment, as shown in the figure, the valve lift amount is decreased as the position of nut 204 approaches transmission member 202, while the valve lift amount is increased as the position of nut 204 gets away from transmission member 202.

Further, a potentiometer type angle sensor 206 detecting the angle of control shaft 16 is disposed on the tip end of control shaft 16. Control unit 115 feedback controls actuator 201 so that an actual angle detected by angle sensor 206 coincides with a target angle.

Next, the structure of VTC 113 will be described based on FIG. 11.

Figure 11:
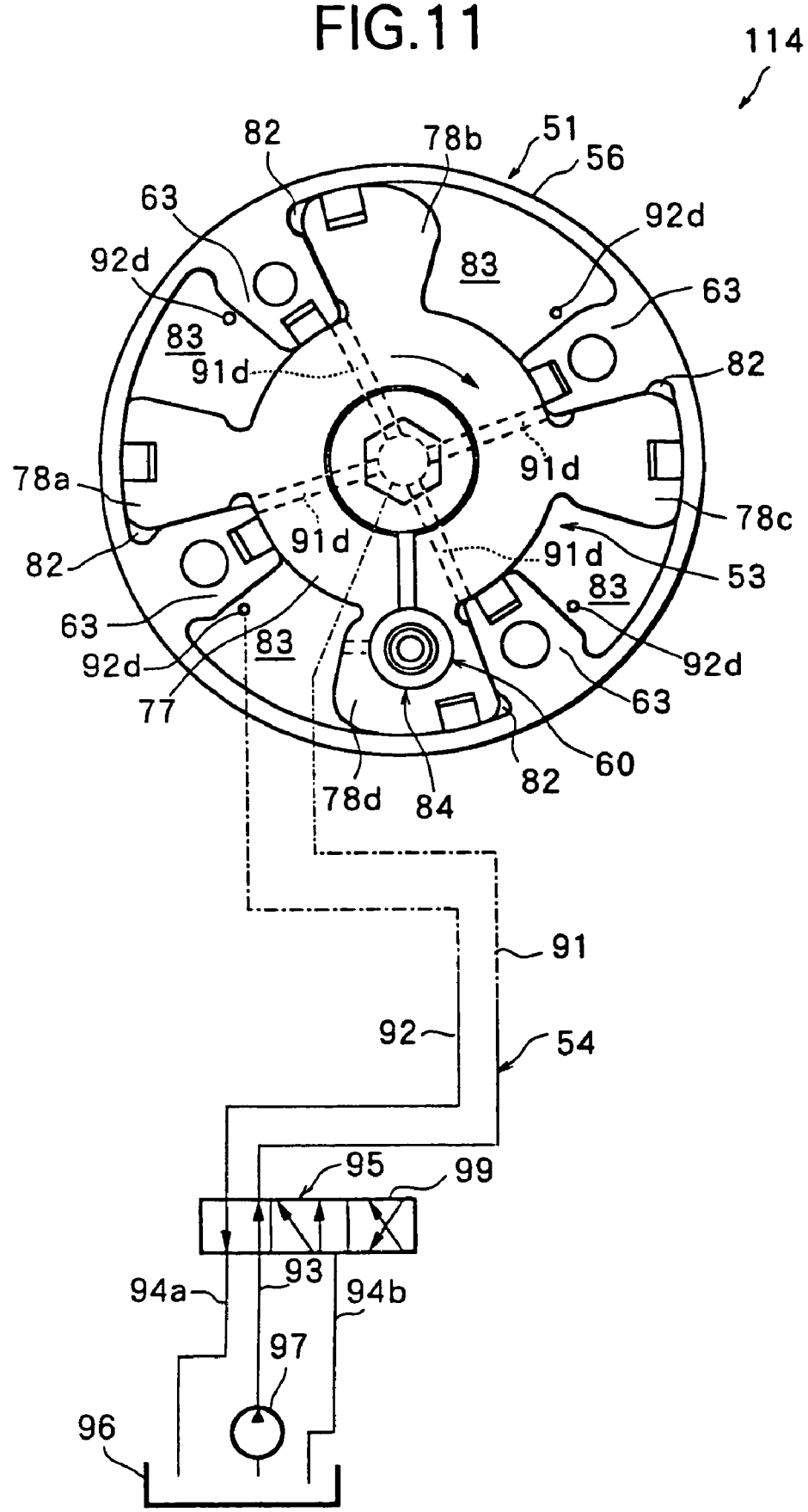
FIG. 11 is a longitudinal cross section view of a variable valve timing mechanism in the embodiment.

Note, VTC 114 is not limited to the one in FIG. 11, and may be of the constitution to successively vary a rotation phase of a camshaft relative to a crankshaft.

VTC 114 in this embodiment is a vane type variable valve timing mechanism, and comprises: a cam sprocket 51 (timing sprocket) which is rotatably driven by a crankshaft 120 via a timing chain; a rotation member 53 secured to an end portion of intake side camshaft 113 and rotatably housed inside cam sprocket 51; a hydraulic circuit 54 that relatively rotates rotation member 53 with respect to cam sprocket 51; and a lock mechanism 60 that selectively locks a relative rotation position between cam sprocket 51 and rotation member 53 at predetermined positions.

Cam sprocket 51 comprises: a rotation portion (not shown in the figure) having on an outer periphery thereof, teeth for engaging with timing chain (or timing belt); a housing 56 located forward of the rotation portion, for rotatably housing rotation member 53; and a front cover and a rear cover (not shown in the figure) for closing the front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of intake side camshaft 113 and comprises an annular base portion 77 having four vanes 78a, 78b, 78c, and 78d provided on an outer peripheral face of base portion 77 at 90° in the circumferential direction.

First through fourth vanes 78a to 78d present respective cross-sections of approximate trapezoidal shapes. The vanes are disposed in recess portions between each partition portion 63 so as to form spaces in the recess portions to the front and rear in the rotation direction. Advance angle side hydraulic chambers 82 and retarded angle side hydraulic chambers 83 are thus formed.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure with respect to advance angle side hydraulic chambers 82, and a second oil pressure passage 92 for supplying and discharging oil pressure with respect to retarded angle side hydraulic chambers 83. To these two oil pressure passages 91 and 92 are connected a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in a base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

With electromagnetic switching valve 95, an internal spool valve is arranged so as to control relatively the switching between respective oil pressure passages 91 and 92, and supply passage 93 and drain passages 94a and 94b.

Control unit 115 controls the power supply quantity for an electromagnetic actuator 99 that drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 97 is supplied to retarded angle side hydraulic chambers 83 via second oil pressure passage 92, and the hydraulic fluid in advance angle side hydraulic chambers 82 is discharged into oil pan 96 from first drain passage 94a via first oil pressure passage 91.

Consequently, an inner pressure of retarded angle side hydraulic chambers 83 becomes a high pressure while an inner pressure of advance angle side hydraulic chambers 82 becomes a low pressure, and rotation member 53 is rotated to the most retarded angle side by means of vanes 78a to 78d. The result of this is that a valve opening period (opening timing and closing timing) is delayed.

On the other hand, when a control signal of duty ratio 100% (ON signal) is output to electromagnetic actuator 99, the hydraulic fluid is supplied to inside of advance angle side hydraulic chambers 82 via first oil pressure passage 91, and the hydraulic fluid in retarded angle side hydraulic chambers 83 is discharged to oil pan 96 via second oil pressure passage 92, and second drain passage 94b, so that retarded angle side hydraulic chambers 83 become a low pressure.

Therefore, rotation member 53 is rotated to the full to the advance angle side by means of vanes 78a to 78d. Due to this, the opening period (opening timing and closing timing) of intake valve 105 is advanced.

Note, variable valve timing mechanism 114 is not limited to the above vane type mechanism, and may be of the constitution as disclosed in Japanese Unexamined Patent Publication Nos. 2001-041013 and 2001-164951 in which a rotation phase of a camshaft relative to a crankshaft is changed by friction braking of an electromagnetic clutch (electromagnetic brake), or of the constitution as disclosed in Japanese Unexamined Patent Publication No. 9-195840 in which a helical gear is operated by a hydraulic pressure.

Next, there will be described controls of VEL 112 and VTC 114, by control unit 115, referring to block diagrams.

Figure 12:
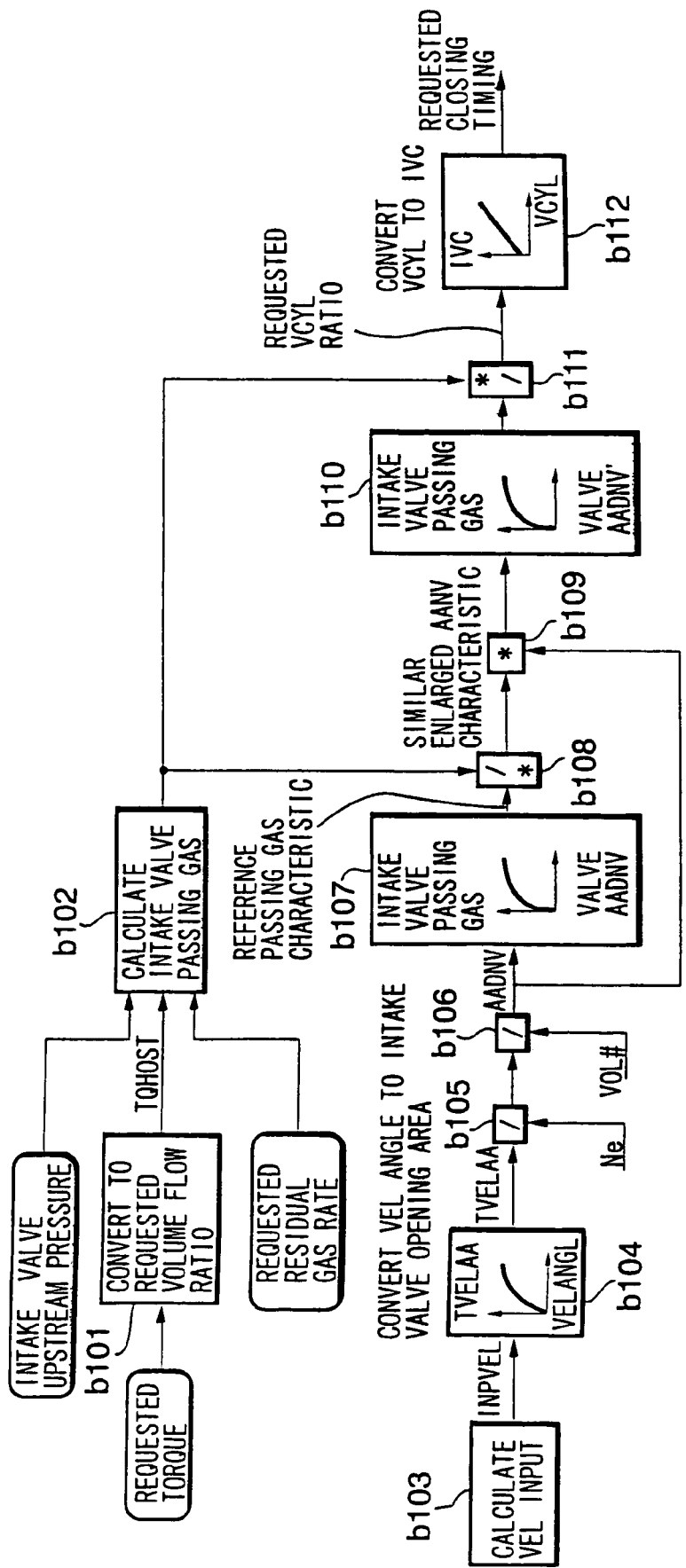
FIG. 12 is a block diagram showing the calculation of requested closing timing of an intake valve in the embodiment.

The block diagram of FIG. 12 shows the calculation of requested closing timing of intake valve 105.

In FIG. 12, a requested engine torque calculated based on the accelerator opening and the like is converted into a requested volume flow ratio TQHOST (requested fresh air amount) in b101.

In b102, a requested valve passing gas amount in intake valve 105 is calculated based on the requested volume flow ratio TQHOST, an upstream pressure of intake valve 105 and a requested residual gas rate.

Figure 13:
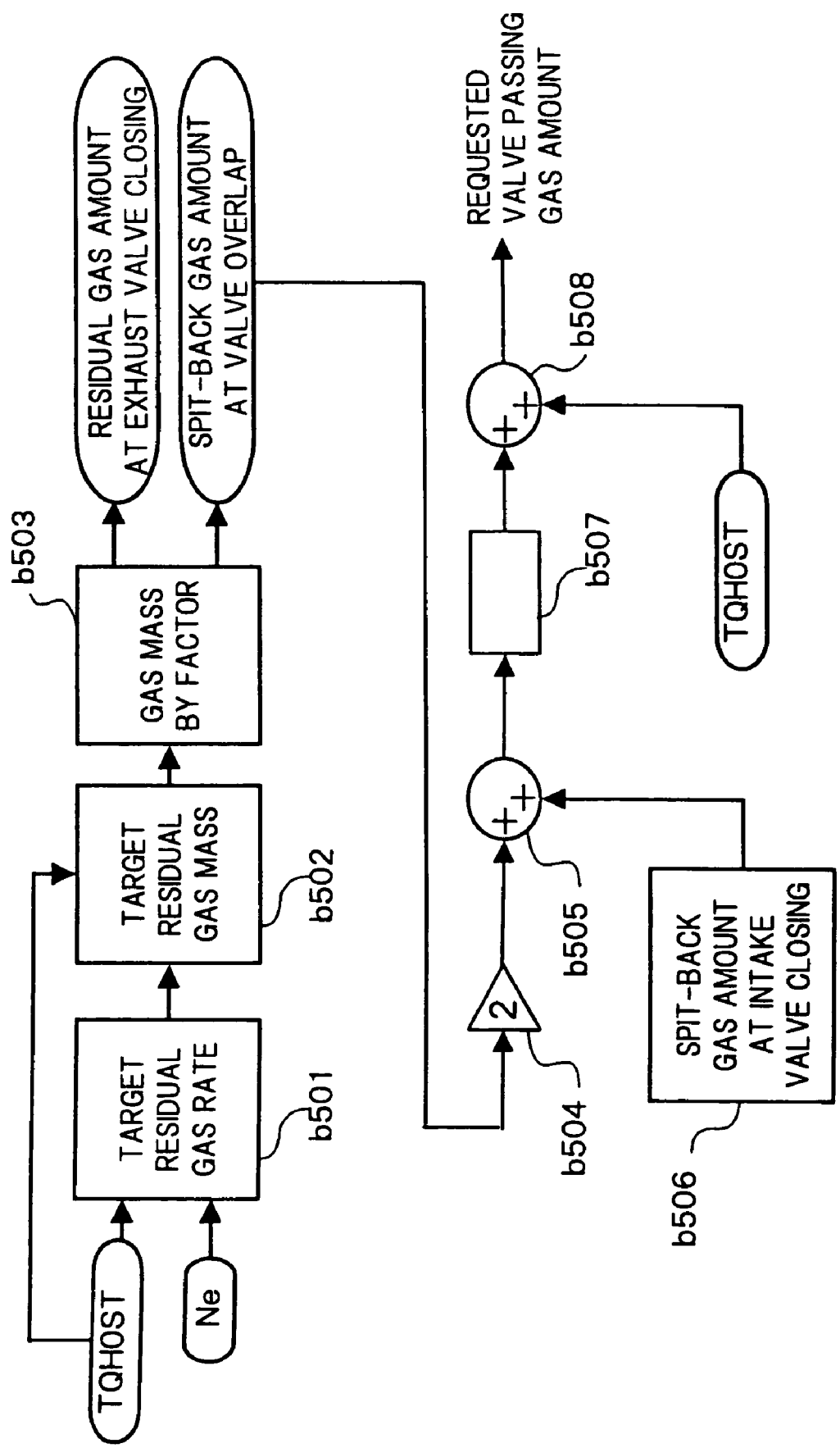
FIG. 13 is a block diagram showing the calculation of a requested valve passing gas amount in the embodiment.

The calculation of requested valve passing gas amount in b102 is executed as shown in the block diagram of FIG. 13.

In FIG. 13, in b501, a target residual gas rate is calculated based on the requested volume flow ratio TQHOST and the engine rotation speed Ne.

In b502, target residual gas mass is calculated based on the target residual gas rate and the requested volume flow ratio TQHOST.

In b503, the target residual gas mass is divided into a residual gas amount that has not been discharged at the closing time of exhaust valve 107, to remain in the cylinder just as it is, and a spit-back gas amount spit-back to an intake pipe side at the valve overlap time (at the opening time of intake valve).

In b504, the spit-back gas amount at the valve overlap time is doubled.

In b505, the amount of two times the spit-back gas amount at the valve overlap time and the spit-back gas amount at the closing time of intake valve 105 to be calculated in b506 are added together.

It is supposed that the gas spit-back to the intake pipe side at the valve overlap time is again flown into the cylinder. As a result, the gas passes through intake valve 105 twice and therefore, is doubled.

However, the spit-back gas is not necessarily doubled, and what multiplication is performed on the spit-back gas should be appropriately set according to the actual behavior of spit-back gas at the valve overlap time.

In b507, the sum of the doubled amount of the spit-back gas amount at the valve overlap time to be calculated as mass and the spit-back gas amount at the closing time of intake valve 105, is converted into a volume flow ratio.

Then, in b508, the volume flow ratio obtained in b507 and the requested volume flow ratio TQHOST are added together, and a result of the addition is finally output as the requested valve passing gas amount.

That is, the requested valve passing gas amount is calculated based on a fresh air amount, the doubled amount of the spit-back gas amount at the valve overlap time (the spit-back gas amount at the opening time of intake valve) and the spit-back gas amount at the closing time of intake valve.

Figure 14:
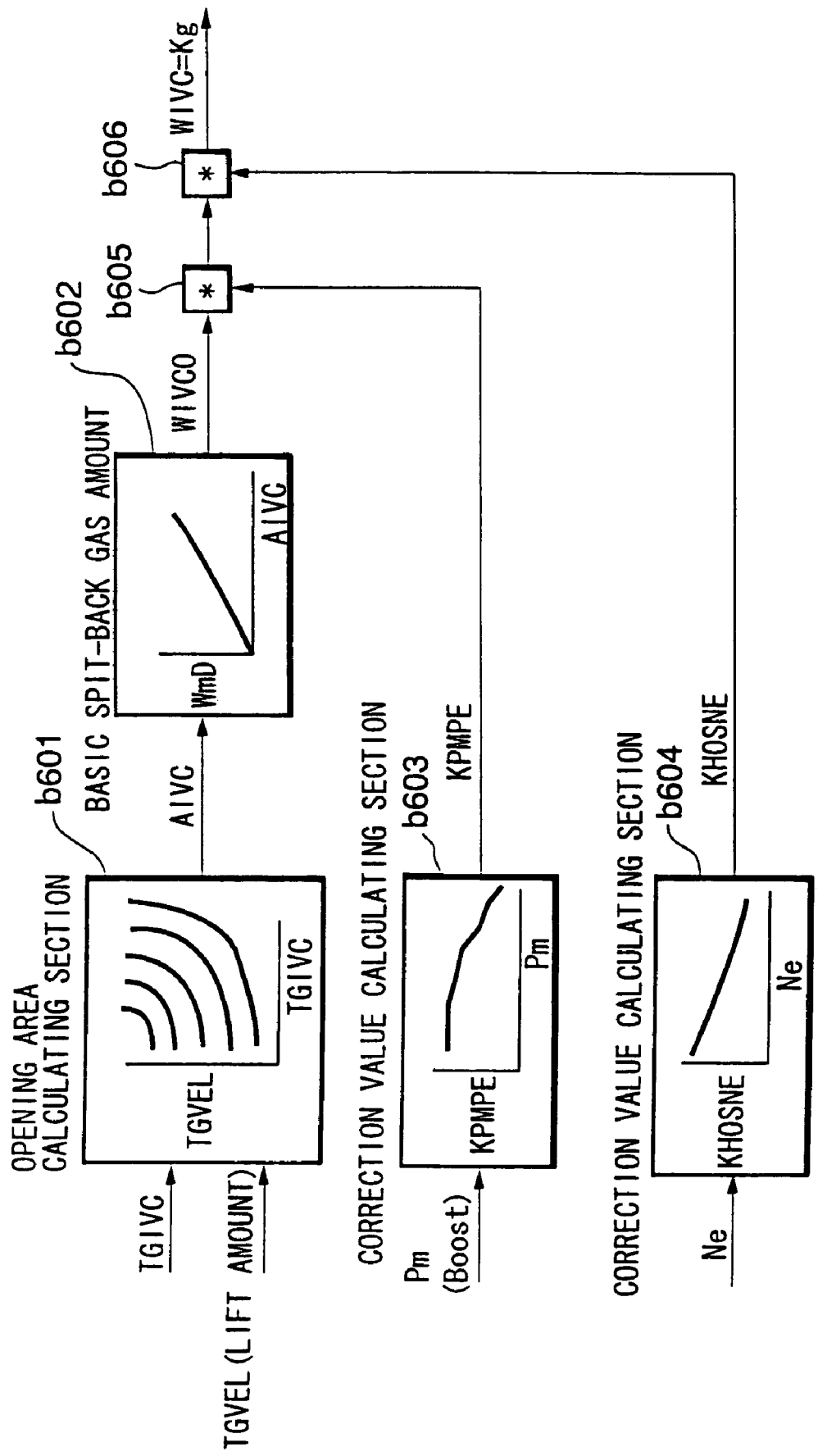
FIG. 14 is a block diagram showing the calculation of a spit-back gas amount in the closing timing of the intake valve in the embodiment.

The spit-back gas amount at the closing time of intake valve is calculated as shown in the block diagram of FIG. 14.

In FIG. 14, in b601, an opening area AIVC of intake valve 105 correlating to the spit-back gas amount is obtained based on target closing timing of intake valve 105 and a target angle TGVEL of control shaft 16 in VEL 112.

In b602, the opening area AIVC obtained in b601 is converted into a basic spit-back gas amount WIVCO at the closing time of intake valve.

On the other hand, in b603, a correction value KPMPE based on an intake pressure Pm is calculated, and in b604, a correction value KHOSNE based on the engine rotation speed Ne is calculated.

Then in b605, the correction value KPMPE is multiplied on the basic spit-back gas amount WIVCO, and in b606, a result of multiplication in b605 is further multiplied by the correction value KHOSNE. A result of multiplication in b606 is output as a final spit-back gas amount at the closing time of intake valve.

Figure 15:
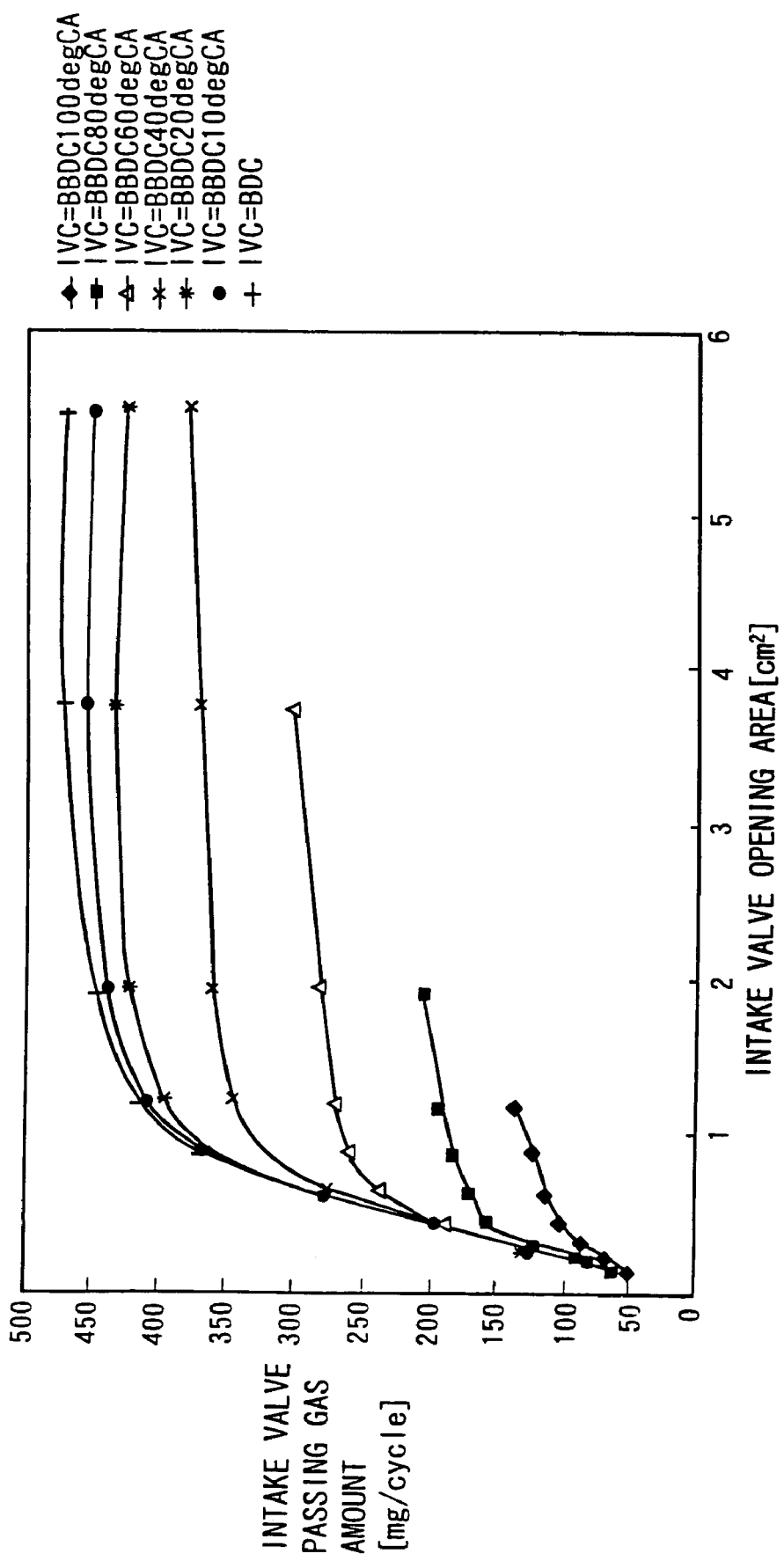
FIG. 15 is a graph showing, at each closing timing, a correlation between an opening area of the intake valve and the valve passing gas amount in the embodiment.

The requested valve passing gas amount calculated in the above manner tends to be increased in all of the regions relative to an increase of opening area of intake valve 105, as shown in FIG. 15.

Accordingly, based on the correlation between the valve passing gas amount and the opening area, a request of opening area for obtaining the requested valve passing gas amount is primarily determined.

Then, the opening area for obtaining the requested valve passing gas amount is obtained based on an actual correlation between the valve passing gas amount and the opening area, thereby enabling of a high accurate control of valve operating characteristic.

Here, the description shall be returned to the block diagram of FIG. 12 to be continued.

In b103, an angle INPVEL of control shaft 16 in VEL 112 is set for calculating the target opening timing and target closing timing of intake valve.

The angle INPVEL is sequentially updated so as to calculate the target opening timing and target closing timing for each valve lift amount within a control range.

The angle INPVEL is converted into an opening area TVELAA of intake valve 105 in b104.

In b105, the opening area TVELAA is divided by the engine rotation number (rpm) at the time.

In b106, a result of division in b105 is further divided by a piston displacement VOL# of engine 101, so that the opening area TVELAA is converted into a state amount AADNV.

The state amount AADNV is converted into a reference valve passing gas amount of intake valve 105 in b107.

A correlation between the state amount AADNV and the valve passing gas amount exists for each effective cylinder capacity. Here, a table is prepared for a correlation of the time when the effective cylinder capacity is 100%.

Note, when the closing timing of intake valve is made a bottom dead center, the effective cylinder capacity is 100%.

Then, the above conversion table is referred to, so that the state amount AADNV is converted into the reference valve passing gas amount.

In b108, the reference valve passing gas amount is divided by the requested valve passing gas amount comprising the fresh air amount, the doubled amount of the spit-back gas amount at the valve overlap time and the spit-back gas amount at the closing timing of intake valve.

In b109, a calculation result in b108 is multiplied on the state amount AADNV.

That is, an output from b109 has the following value.

Output AADNV' from b109=AADNV×(reference valve passing gas amount/requested valve passing gas amount)

In b111, by referring to the conversion table same as that referred to in b107, the valve passing gas amount corresponding to the state amount AADNV' corrected in b109 is obtained.

In bill, the requested valve passing gas amount is divided by the valve passing gas amount obtained in b110, to obtain a requested cylinder capacity ratio.

Requested cylinder capacity ratio=Requested valve passing gas amount/valve passing gas amount corresponding to AADNV'

In b112, the requested cylinder capacity ratio is converted into the requested closing timing of intake valve 105 according to the engine rotation speed Ne at the time.

The requested closing timing of intake valve 105 is set such that intake valve 105 is closed before the bottom dead center as the requested cylinder capacity ratio becomes smaller.

The correlation between the state amount AADNV and the valve passing gas amount exists for each effective cylinder capacity. As shown in FIG. 15, the characteristic lines of the state amount AADNV and the valve passing gas amount are in a relation similar to each other.

Here, the referring to the correlation of the time when the effective cylinder capacity=100% based on the state amount AADNV' corrected based on the reference valve passing gas amount/requested valve passing gas amount equals to the referring to the correlation obtained by similarly enlarging the correlation in the effective cylinder capacity by which the requested valve passing gas amount can be obtained based on the state amount AADNV.

Then, the requested valve passing gas amount is divided by the valve passing gas amount obtained by referring to the correlation of the time when the effective cylinder capacity=100% based on the state amount AADNV', resulting in that the effective cylinder capacity for obtaining the requested valve passing gas amount is obtained based on the angle INPVEL at the time.

If the constitution is such that the effective cylinder capacity for obtaining the requested valve passing gas amount is obtained based on the angle INPVEL at the time, as described above, since it is only necessary to store the correlation between the state amount AADNV of the time when the effective cylinder capacity=100% and the valve passing gas amount, it is possible to reduce the storage capacity and the matching processes.

Figure 16:
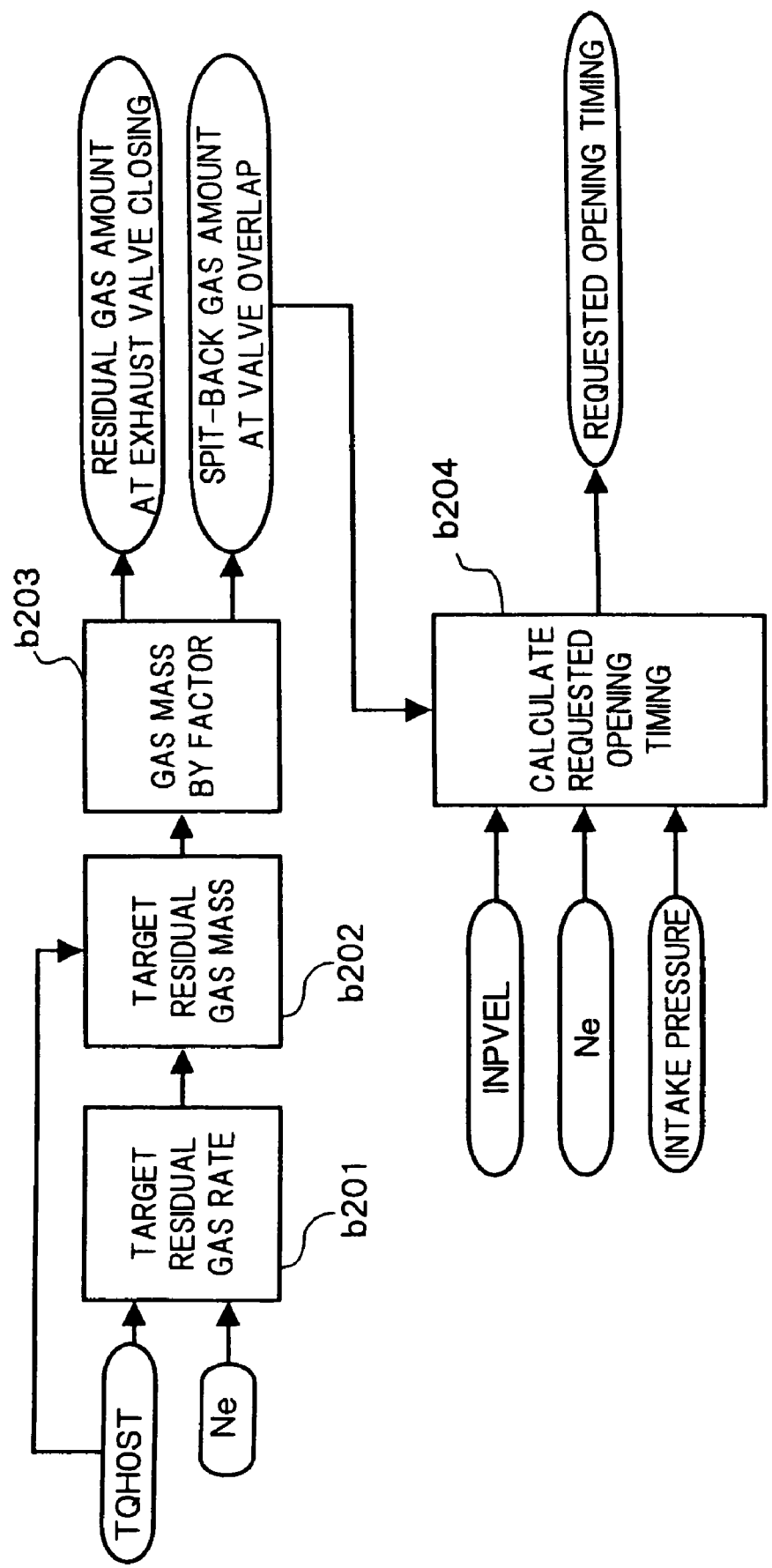
FIG. 16 is a block diagram showing the calculation of requested opening timing of the intake valve in the embodiment.

On the other hand, the requested opening timing of intake valve 105 is set as shown in the block diagram of FIG. 16.

In b201, the target residual gas rate is set based on the requested volume flow ratio TQHOST and the engine rotation speed Ne.

In b202, the target residual gas mass is calculated based on the target residual gas rate and the requested volume flow ratio TQHOST.

In b203, the target residual gas mass is divided into a portion to remain as it is in the cylinder at closing timing of exhaust valve 107 and a portion to be spit back at the valve overlap time.

In b204, the requested opening timing of intake valve 105 is calculated based on the spit-back portion at the valve overlap time, the engine rotation speed Ne and the intake pressure.

Figure 17:
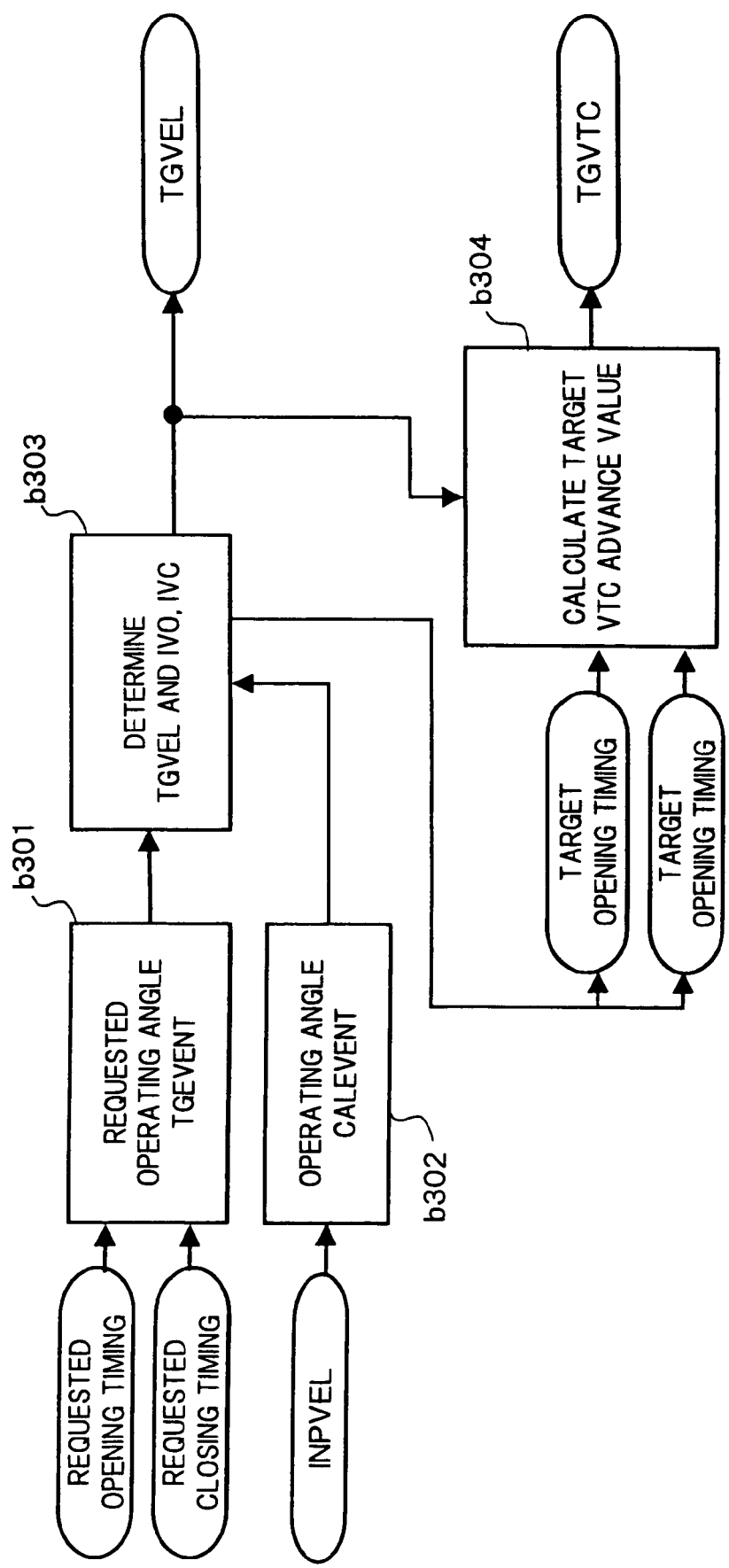
FIG. 17 is a block diagram showing the calculation of a target operating characteristic of the intake valve in the embodiment.

The block diagram of FIG. 17 shows the calculation of a control target angle TGVEL of control shaft 16 in VEL 112 based on the requested closing timing and requested opening timing of intake valve 105 and also the calculation of an advance control target by VTC 114.

In b301, a requested operating angle REQEVENT is calculated based on the requested closing timing and requested opening timing of intake valve 105.

In b302, the angle INPVEL is converted into an operating angle CALEVENT of intake valve 105.

Then, in b303, the control target angle TGVEL is calculated based on the above described REQEVENT and CALEVENT.

Specifically, a deviation between REQEVENT and CALEVENT is calculated to be stored for each angle INPVEL, to select a combination of the angle INPVEL at which an absolute value of the deviation becomes smallest, the requested closing timing and the requested opening timing.

Then, the angle INPVEL at which the absolute value of the deviation becomes smallest is set to the control target angle TGVEL, and the requested closing timing and the requested opening timing calculated corresponding to the angle INPVEL at which the absolute value of the deviation becomes smallest are set as final target opening/closing timing, to be output together with the control target angle TGVEL to b304.

In b304, an advance target of valve timing for achieving the target opening/closing timing at the control target angle TGVEL, that is, a control target TGVTC of VTC 114, is set.

Then, VTC 114 is controlled based on the control target TGVTC, and the center phase of the operating angle of intake valve 105, which is determined based on the control target angle TGVEL, is controlled to be advanced or retarded in accordance with the control target TGVTC.

Thus, intake valve 105 is driven at the opening area and the opening/closing timing, at which the requested valve passing gas amount and the requested residual gas rate can be obtained.

The entire contents of Japanese Patent Application Nos. 2002-350276 and 2002-350277, filed Dec. 2, 2002, respectively, priorities of which are claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed is:

1. A variable valve control method for an internal combustion engine provided with a variable valve mechanism that varies an operating characteristic of an intake valve, for controlling a gas amount passing through said intake valve by variably controlling said operating characteristic, comprising the steps of:

calculating an amount of fresh air that flows into a cylinder based on a requested torque;

calculating a gas amount spit-back to an intake side from the inside of the cylinder when said intake valve is opened, based on a requested residual gas rate;

calculating a requested gas amount passing through said intake valve, based on an amount of predetermined times the spit-back gas amount of the time when said intake valve is opened and said fresh air amount;

setting a target operating characteristic of said intake valve based on said requested valve passing gas amount; and controlling said variable valve mechanism based on said target operating characteristic.

2. A variable valve control method for an internal combustion engine according to claim 1, wherein there are provided, as said variable valve mechanism, a variable valve event and lift mechanism that successively varies a valve lift of said intake valve together with an operating angle of said intake valve, and a variable valve timing mechanism that successively varies a center phase of the operating angle of said intake valve; and wherein said step of controlling said variable valve mechanism comprises the steps of:

calculating requested closing timing of said intake valve, at which said requested valve passing gas amount can be obtained, when an opening area of said intake valve is a predetermined value;

calculating requested opening timing of said intake valve based on said residual gas rate and said predetermined opening area;

setting, as a control target of said variable valve event and lift mechanism, a valve lift or an operating angle which satisfies, with said predetermined opening area, an operating angle obtained based on said requested closing timing and requested opening timing; and setting a control target of said variable valve timing mechanism so as to satisfy said requested closing timing and requested opening timing.

* * * * *